United States Patent
Charles

(10) Patent No.: US 10,040,536 B2
(45) Date of Patent: Aug. 7, 2018

(54) WING STRUCTURE, STRINGER STRUCTURE, AND RELATED APPARATUS AND METHODS OF ASSEMBLY

(71) Applicant: The Boeing Company, Huntington Beach, CA (US)

(72) Inventor: Jordan Charles, Cambridge, MA (US)

(73) Assignee: The Boeing Company, Chicago, IL (US)

(*) Notice: Subject to any disclaimer, the term of this patent is extended or adjusted under 35 U.S.C. 154(b) by 224 days.

(21) Appl. No.: 14/856,634

(22) Filed: Sep. 17, 2015

(65) Prior Publication Data

US 2017/0081015 A1    Mar. 23, 2017

(51) Int. Cl.
| | |
|---|---|
| *B64C 1/00* | (2006.01) |
| *B64C 3/00* | (2006.01) |
| *B64C 5/00* | (2006.01) |
| *B64C 3/18* | (2006.01) |
| *B64F 5/00* | (2017.01) |

(52) U.S. Cl.
CPC ............ *B64C 3/182* (2013.01); *B64F 5/0009* (2013.01)

(58) Field of Classification Search
CPC .............. B64C 3/182; B64C 1/26; B64C 3/18
See application file for complete search history.

(56) References Cited

U.S. PATENT DOCUMENTS

| 7,681,835 B2 | 3/2010 | Simpson et al. |
| 8,993,097 B2* | 3/2015 | Kwon ..................... B64C 1/064 428/174 |
| 9,027,881 B2* | 5/2015 | Tanaka ................... B64C 3/182 244/123.1 |
| 9,108,718 B2* | 8/2015 | Yoshida .................. B64C 1/061 |
| 9,475,568 B2* | 10/2016 | Kashiwagi ............... B64C 3/20 |
| 9,751,608 B2* | 9/2017 | Tanaka .................... B64C 1/064 |
| 2012/0121854 A1* | 5/2012 | Yoshida .................. B64C 1/061 428/137 |
| 2013/0089712 A1* | 4/2013 | Kwon ..................... B64C 1/064 428/174 |
| 2013/0216766 A1* | 8/2013 | Tanaka ................... B64C 3/182 428/99 |
| 2013/0236692 A1* | 9/2013 | Tanaka ................... B64C 3/182 428/137 |
| 2013/0243992 A1* | 9/2013 | Tanaka ................... B64C 3/182 428/58 |
| 2016/0207607 A1* | 7/2016 | Charles .................. B64C 1/064 |

* cited by examiner

*Primary Examiner* — Philip J Bonzell
(74) *Attorney, Agent, or Firm* — Armstrong Teasdale LLP

(57) ABSTRACT

A wing structure for use with an aircraft is provided. The wing structure includes at least one wing section including an inboard portion, an outboard portion angled rearward from said inboard portion, and at least one stringer including a curved portion that extends across an interface defined between the inboard portion and the outboard portion. The curved portion has a radial curvature such that the at least one stringer extends continuously along the inboard portion and the outboard portion.

7 Claims, 17 Drawing Sheets

WING STRUCTURE, STRINGER STRUCTURE, AND RELATED APPARATUS AND METHODS OF ASSEMBLY

BACKGROUND

The field of the present disclosure relates generally to aircraft manufacturing and, more specifically, to a continuous wing structure having a progressively sweeping planform.

At least some known wing assemblies in an aircraft include a central wing box generally positioned within a fuselage of the aircraft, and wing sections extending from opposing sides of the central wing box. The wing sections are sometimes angled rearward from the central wing box defining a swept wing configuration, and are coupled to the central wing box with a plurality of side of body joints. A typical side of body joint provides a chordwise splice of the wing sections to the central wing box, and is the primary attachment feature for the wing sections to the fuselage of the aircraft. As such, the side of body joint must have a robust design to ensure the integrity of the wing assembly is maintained during flight.

The side of body joints generally include an upper panel joint and a lower panel joint for each wing section. The upper and lower panel joints are generally formed from heavy metallic materials, such as titanium, and require many fasteners for coupling the joints to upper and lower panels of the aircraft, and to respective sections of the wing assembly. Titanium is often typically expensive, heavy, and requires complicated machining steps for forming objects therefrom. As such, the side of body joints generally increase the overall weight of the wing assembly, which facilitates reducing the fuel efficiency of the aircraft. Moreover, installing fasteners can be a time-consuming and laborious task.

BRIEF DESCRIPTION

In one aspect, a wing structure for use with an aircraft is provided. The wing structure includes at least one wing section including an inboard portion, an outboard portion angled rearward from said inboard portion, and at least one stringer including a curved portion that extends across an interface defined between the inboard portion and the outboard portion. The curved portion has a radial curvature such that the at least one stringer extends continuously along the inboard portion and the outboard portion.

In another aspect, an aircraft is provided. The aircraft includes a fuselage, and at least one wing section coupled to the fuselage. The at least one wing section includes an inboard portion, an outboard portion angled rearward from said inboard portion, and at least one stringer including a curved portion that extends across an interface defined between the inboard portion and the outboard portion. The curved portion has a radial curvature such that the at least one stringer extends continuously along the inboard portion and the outboard portion.

In another aspect, a stringer structure for use in an aircraft assembly is provided. The stringer structure includes at least one straight portion, and a curved portion extending from the at least one straight portion. At least a portion of the curved portion has a radial curvature value greater than a predetermined threshold, and the stringer structure is formed from a plurality of ply segments.

In another aspect, an apparatus for forming a composite structure is provided. The apparatus includes a stringer forming tool including a first straight section, a second straight section, and a curved section extending between the first and second straight sections. The apparatus also includes a ply layup device configured to position a plurality ply segments along a length of the stringer forming tool such that a continuous stringer half structure is formed from the plurality of ply segments.

In yet another aspect, a method of forming a composite structure is provided. The method includes positioning a ply layup device at a first position relative to a stringer forming tool having a first straight section, a second straight section, and a curved section extending between the first and second straight sections. The method also includes positioning a first ply segment along a first portion of a length of the stringer forming tool, positioning the ply layup device at a second position relative to the stringer forming tool, and positioning a second ply segment along a second portion of the length of the stringer forming tool such that the first and second ply segments at least partially overlap with each other.

DETAILED DESCRIPTION

The implementations described herein relate to either a one-piece or a two-piece wing structure and related apparatuses and methods of manufacture. The wing structures are formed primarily from composite material, and are sized such that either the one-piece wing structure or wing sections of a larger two-piece wing structure are capable of being cured in a single autoclave cycle. More specifically, the wing structures include continuous stringer structures having a curved portion extending across an interface between inboard and outboard portions of the wing structure. The curved portions of the stringer structures enable the stringer structures to extend the full length of the wing structure, and enable the wing structures to have a progressively sweeping planform, rather than a central wing box and two wing sections sharply angled and extending rearward from the central wing box. Moreover, the curved portions of the progressively sweeping planform are defined relative to the fuselage such that aerodynamic inefficiencies of the wing structure are reduced. As such, the wing structures described herein are lighter, more efficient, and less costly than other known alternatives.

Figure 1:
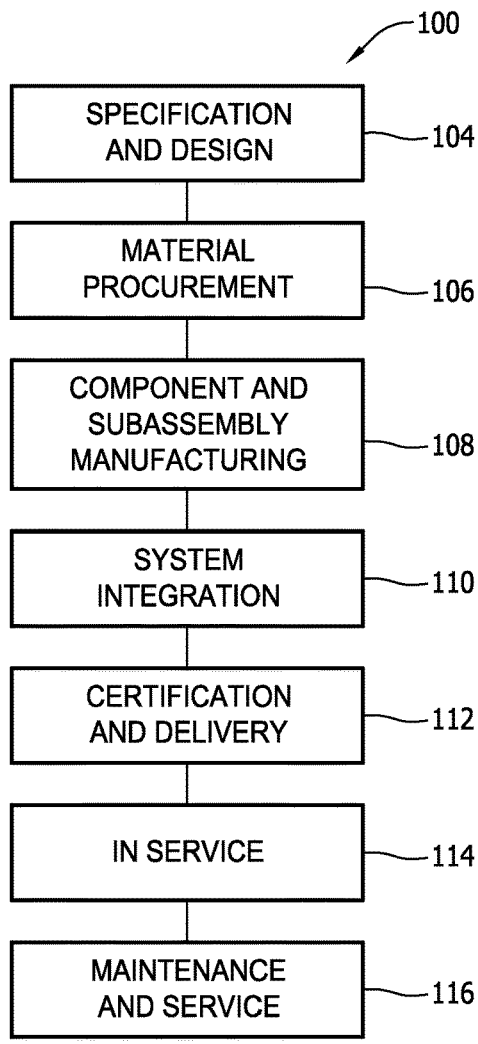
FIG. 1 is a flow diagram of an exemplary aircraft production and service method.
Figure 2:
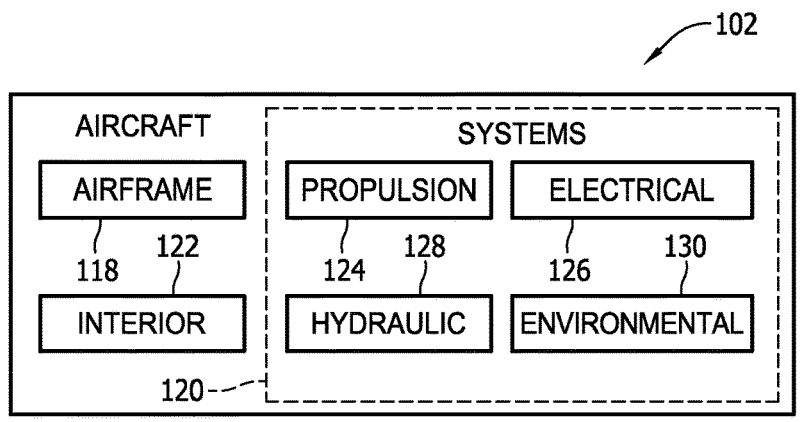
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via platforms other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component and subassembly production process 108 may be fabricated or manufactured in a manner similar to components or subassemblies produced while aircraft 102 is in service 114. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

Figure 3:
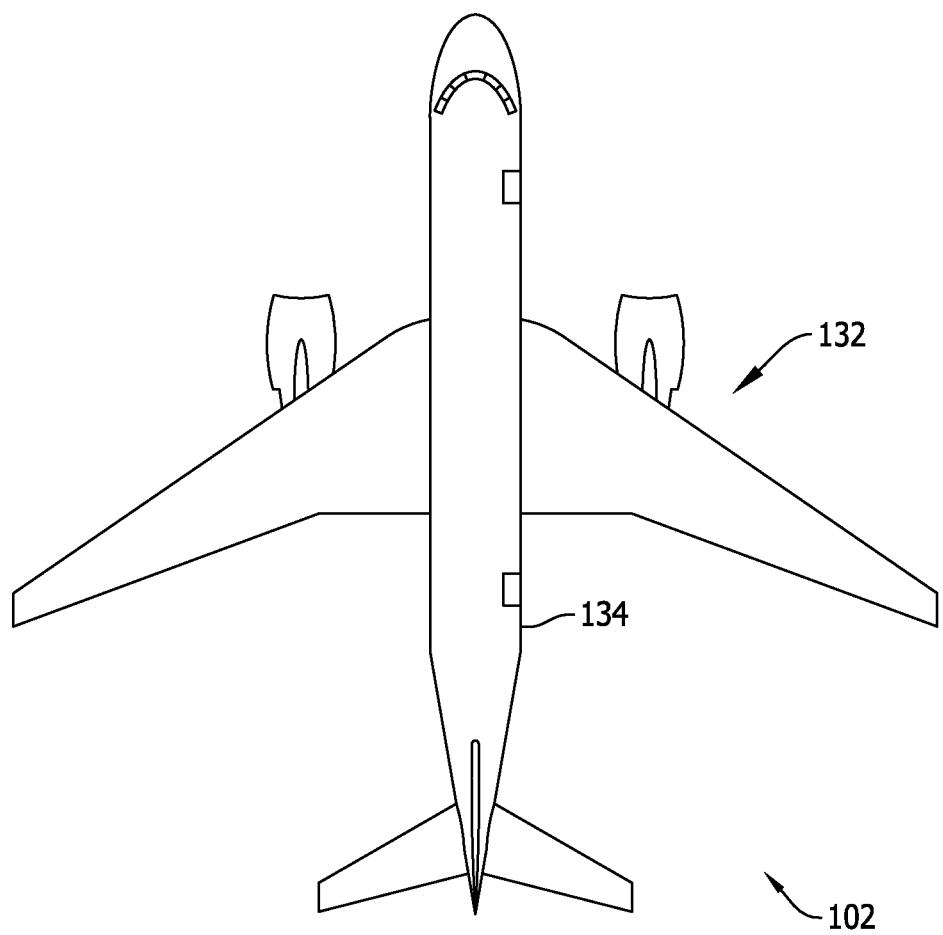
FIG. 3 is a schematic illustration of an exemplary aircraft.

FIG. 3 is a schematic illustration of aircraft 102. Aircraft 102 includes a wing structure 132 formed from at least one wing section (not shown in FIG. 3) coupled to and extending from a fuselage 134. The plurality of structures shown on aircraft 102 is for illustrative purposes only, and it should be understood that aircraft 102 additionally includes a large number of other structures. As used herein, the term "aircraft" may include, but is not limited to only including, airplanes, unmanned aerial vehicles (UAVs), gliders, helicopters, and/or any other object that travels through airspace. Moreover, it should be understood that, although an aerospace example is shown, the principles of the disclosure may be applied to other structures, such as a maritime structure or an automotive structure.

Figure 4:
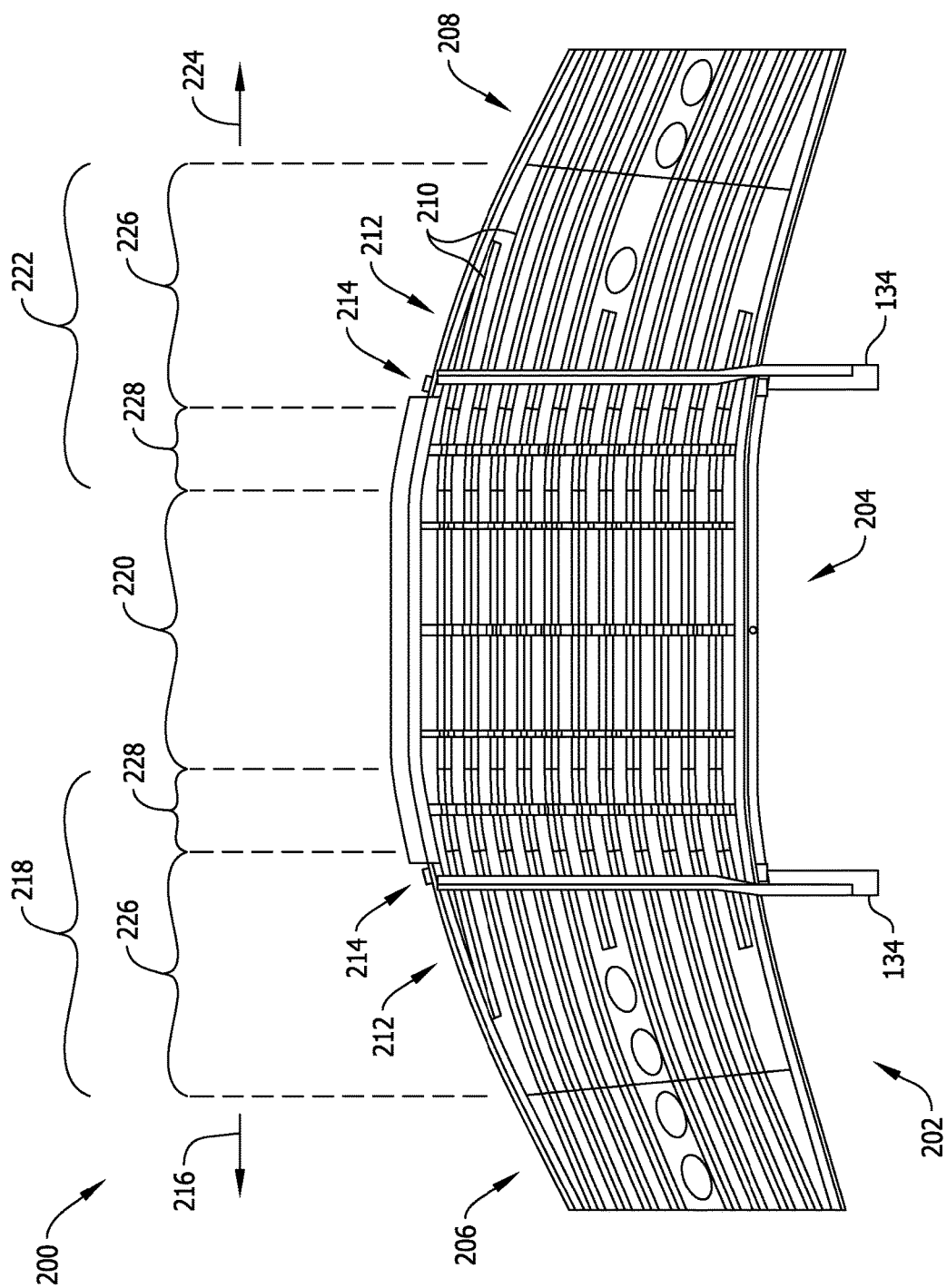
FIG. 4 is a schematic illustration of an exemplary one-piece wing structure that may be used with the aircraft shown in FIG. 3.

FIG. 4 is a schematic illustration of an exemplary one-piece wing structure 200 that may be used with aircraft 102. In the exemplary implementation, one-piece wing structure 200 includes at least one wing section 202 including an inboard portion 204 and two outboard portions angled rearward from inboard portion 204. More specifically, one-piece wing structure 200 includes a first outboard portion 206 and a second outboard portion 208 angled rearward from opposing sides of inboard portion 204. One-piece wing structure 200 also includes at least one stringer 210 having a curved portion 212 that extends across an interface 214 defined between inboard portion 204 and at least one of outboard portions 206 and 208. Curved portion 212 of stringer 210 has a radial curvature that enables the at least one stringer 210 to extend continuously along inboard portion 204 and at least one of outboard portions 206 and 208. For example, in one implementation, curved portion 212 has a radial curvature such that the at least one stringer 210 extends continuously along at least a portion first outboard portion 206, inboard portion 204, and at least a portion of second outboard portion 208. As such, extending stringers 210 continuously along a span of one-piece wing structure 200 enables it to be formed as a unitary structure. As used herein, "continuous" or "continuously" refers to a structure formed without kinks or breaks, and without a splice element connecting adjacent portions of the structure.

Stringers 210 in one-piece wing structure 200 also include at least one straight portion extending from curved portions 212 thereof. In the exemplary implementation, stringers 210 that extend continuously along inboard portion 204 and outboard portions 206 and 208 include a first straight portion 216, a first curved portion 218 extending from first straight portion 216, a second straight portion 220 extending from first curved portion 218, a second curved portion 222 extending from second straight portion 220, and a third straight portion 224 extending from second curved portion 222. First straight portion 216 extends outboard from first curved portion 218 towards a wing tip (not shown) of first outboard portion 206, third straight portion 224 extends outboard from second curved portion 222 towards a wing tip (not shown) of second outboard portion 208, and second straight portion 220 extends within inboard portion 204 of one-piece wing structure 200.

In the exemplary implementation, curved portions 218 and 222 include a first curved segment 226 extending outboard from interface 214, and a second curved segment 228 extending inboard from interface 214. First and second curved segments 226 and 228 have different radial curvatures. As used herein, "radial curvature" refers to a curvature of a structure defined by the radius of a circular arc. For example, first curved segment 226 has a radial curvature value of at least about 500 inches, and second curved segment 228 has a radial curvature value less than the radial curvature value of first curved segment 226. In one implementation, the radial curvature value of second curved segment 228 is about 175 inches. As such, one-piece wing structure 200 progressively normalizes towards a traditional wing planform outboard from fuselage 134 at first and third straight portions 216 and 224 of stringers 210.

Alternatively, first and second curved segments 226 and 228 may have any radial curvature values that enable stringers 210 to function as described herein.

Figure 5:
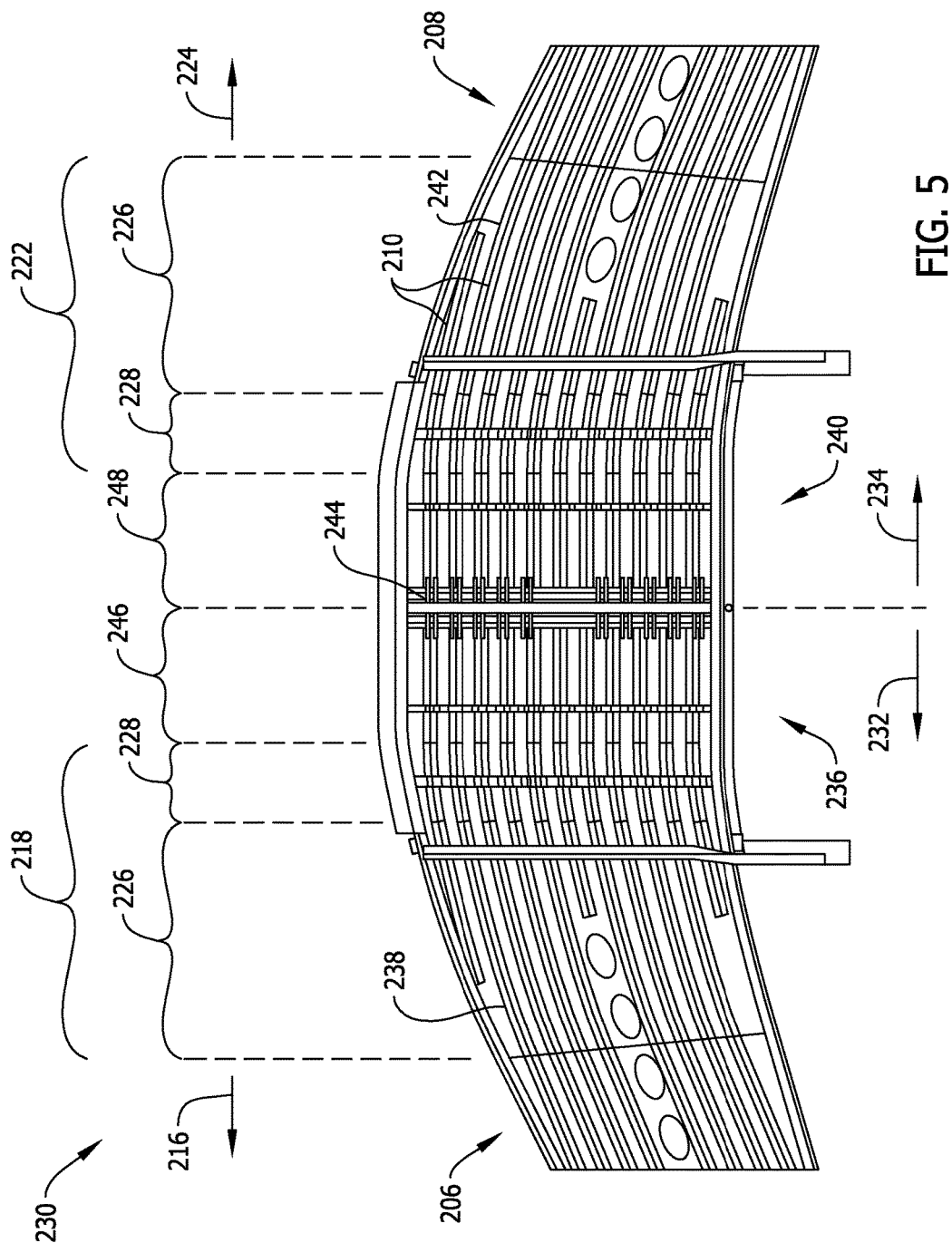
FIG. 5 is a schematic illustration of an exemplary two-piece wing structure that may be used with the aircraft shown in FIG. 3.

FIG. 5 is a schematic illustration of an exemplary two-piece wing structure 230 that may be used with aircraft 102. In the exemplary implementation, two-piece wing structure 230 includes a first wing section 232 and a second wing section 234. First wing section 232 includes a first inboard portion 236, first outboard portion 206 extending therefrom, and a first stringer 238 that extends at least partially along first inboard portion 236 and first outboard portion 206. Likewise, second wing section 234 includes a second inboard portion 240, second outboard portion 208, and a second stringer 242 that extends at least partially along second inboard portion 240 and second outboard portion 208. Two-piece wing structure 230 is generally longer in the spanwise direction than one-piece wing structure 200. As such, two-piece wing structure 230 is split into first and second wing sections 232 and 234 such that each wing section 232 and 234 is capable of being positioned within a traditionally-sized autoclave. Two-piece wing structure 230 also includes a coupling mechanism 244 that couples first and second wing sections 232 and 234 at first and second inboard portions 236 and 240, thereby forming a complete two-piece wing structure 230.

In the exemplary implementation, first stringer 210 includes first straight portion 216, first curved portion 218 extending from first straight portion 216, and a first truncated straight portion 246 extending from first curved portion 218. Likewise, second stringer 210 includes a second truncated straight portion 248 generally aligned with first truncated straight portion 246, second curved portion 222 extending from second truncated straight portion 248, and third straight portion 224 extending from second curved portion 222.

Figure 6:
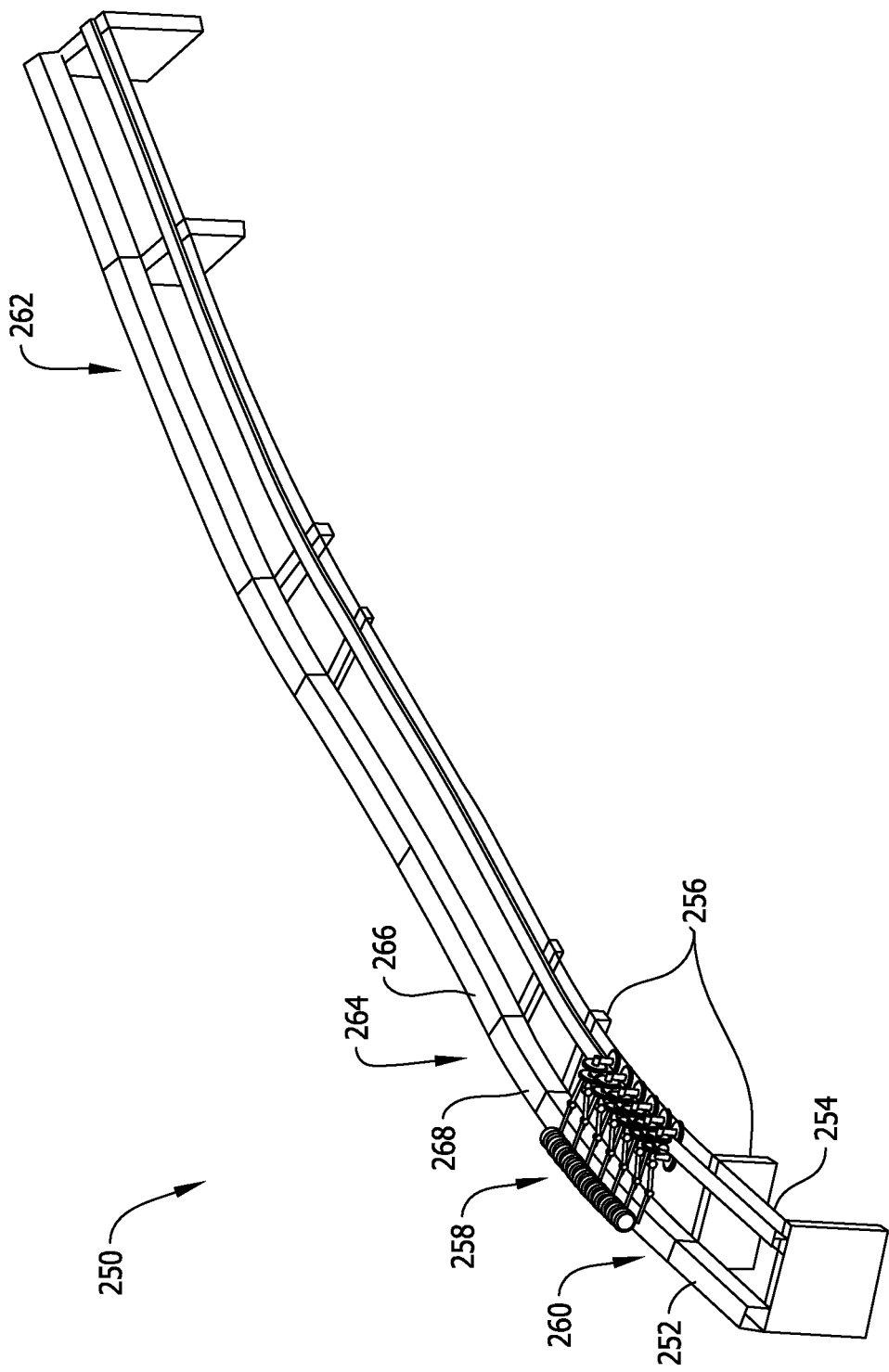
FIG. 6 is a perspective view of an exemplary apparatus for forming a composite structure.

FIG. 6 is a perspective view of an exemplary apparatus 250 for forming a composite structure, such as a continuous stringer half structure of stringers 210 (shown in FIGS. 4 and 5). In the exemplary implementation, stringers 210 are formed from a plurality of ply segments (not shown in FIG. 6) of composite material. Apparatus 250 includes a first stringer forming tool 252 and a track 254 extending substantially coaxially with first stringer forming tool 252. At least one bracket 256 is coupled to first stringer forming tool 252 and track 254, such that the at least one bracket 256 maintains a distance between first stringer forming tool 252 and track 254 along the lengths thereof. Apparatus 250 also includes a ply layup device 258 for positioning a plurality of ply segments along the length of first stringer forming tool 252. Ply layup device 258 is coupled to track 254, and is selectively positionable along the length of track 254 when positioning each ply segment along first stringer forming tool 252.

As will be described in more detail below, the plurality of ply segments are cured on first stringer forming tool 252 in-situ when forming the continuous stringer half structure. As such, in one implementation, first stringer forming tool 252 has a contour that generally corresponds to a desired final shape of second stringer 210 in two-piece wing structure 230 (shown in FIG. 5), for example. More specifically, first stringer forming tool 252 includes a first straight section 260, a second straight section 262, and a curved section 264 extending between first and second straight sections 260 and 262. First straight section 260 generally corresponds to second truncated straight portion 248 of second stringer 210, curved section 264 generally corresponds to second curved portion 222 of second stringer 210, and second straight section 262 generally corresponds to third straight portion 224 of second stringer 210.

Similar to second stringer 210, curved section 264 includes a first curved segment 266 and a second curved segment 268, having different radial curvatures. As such, first curved segment 266 has a radial curvature value of at least about 500 inches, and second curved segment 268 has a radial curvature value less than the radial curvature value of first curved segment 266. In one implementation, the radial curvature value of second curved segment 268 is about 175 inches.

Figure 7:
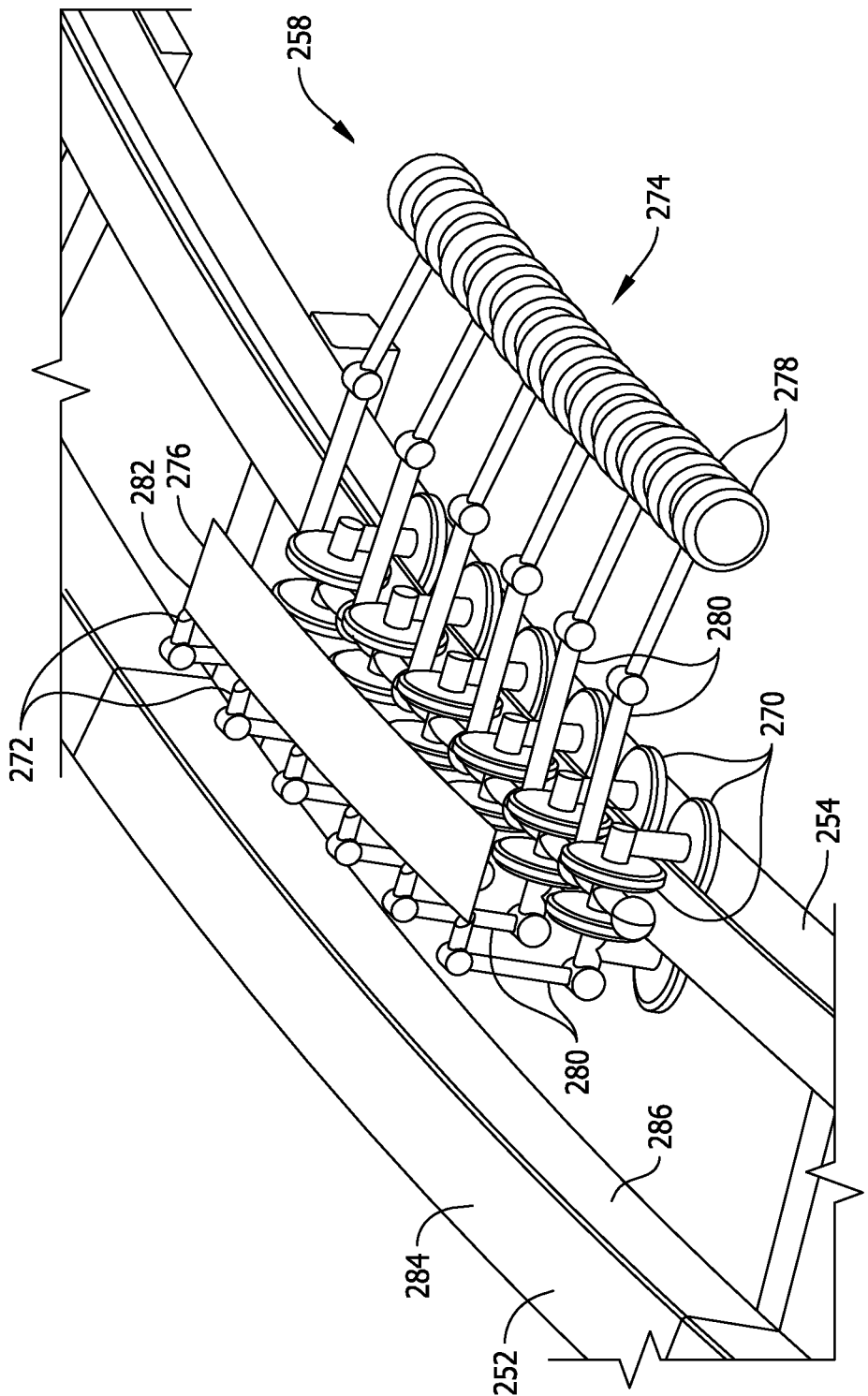
FIG. 7 is a perspective view of a ply layup device in a first operational position that may be used with the apparatus shown in FIG. 6.
Figure 8:
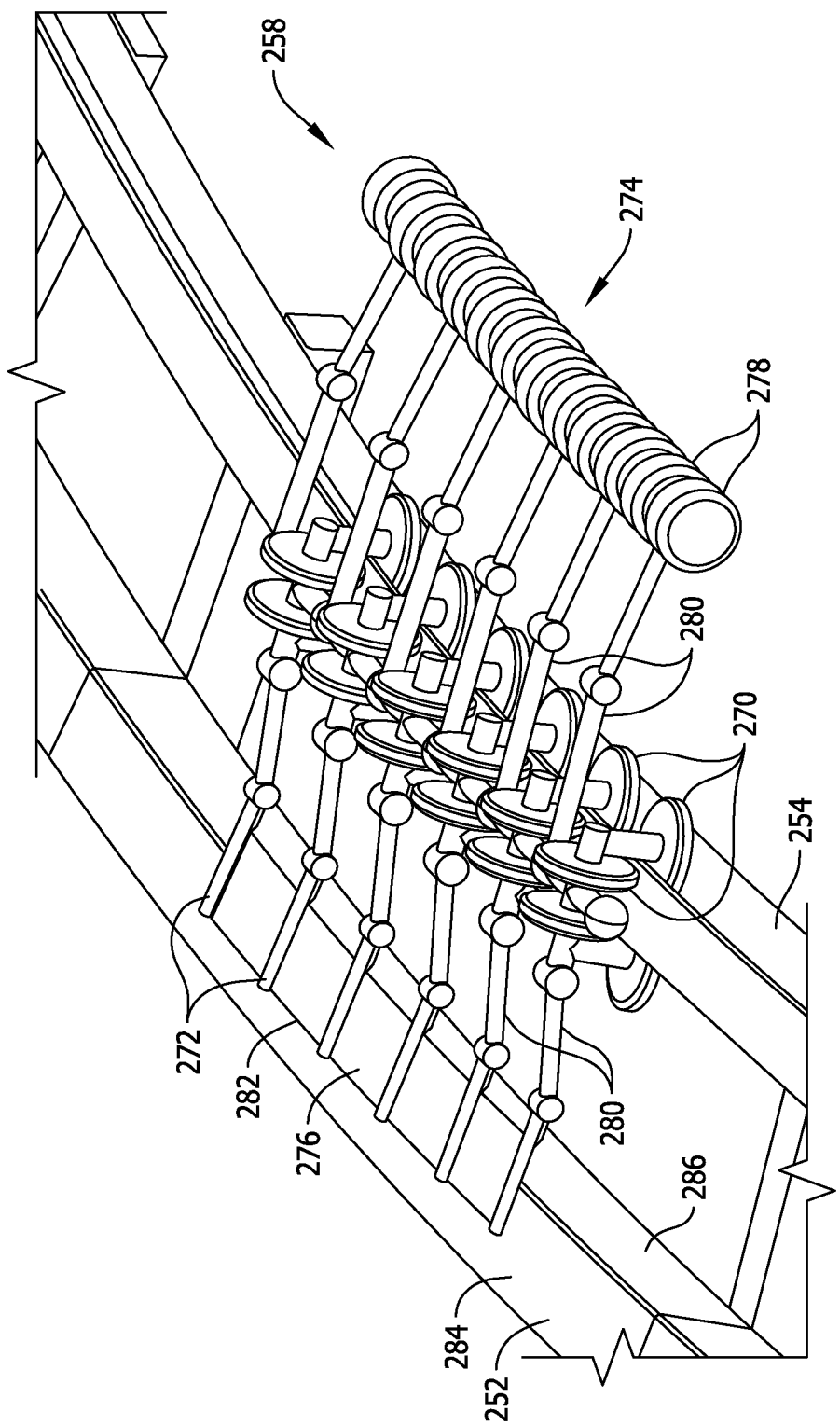
FIG. 8 is a perspective view of the ply layup device shown in FIG. 7 in a second operational position.
Figure 9:
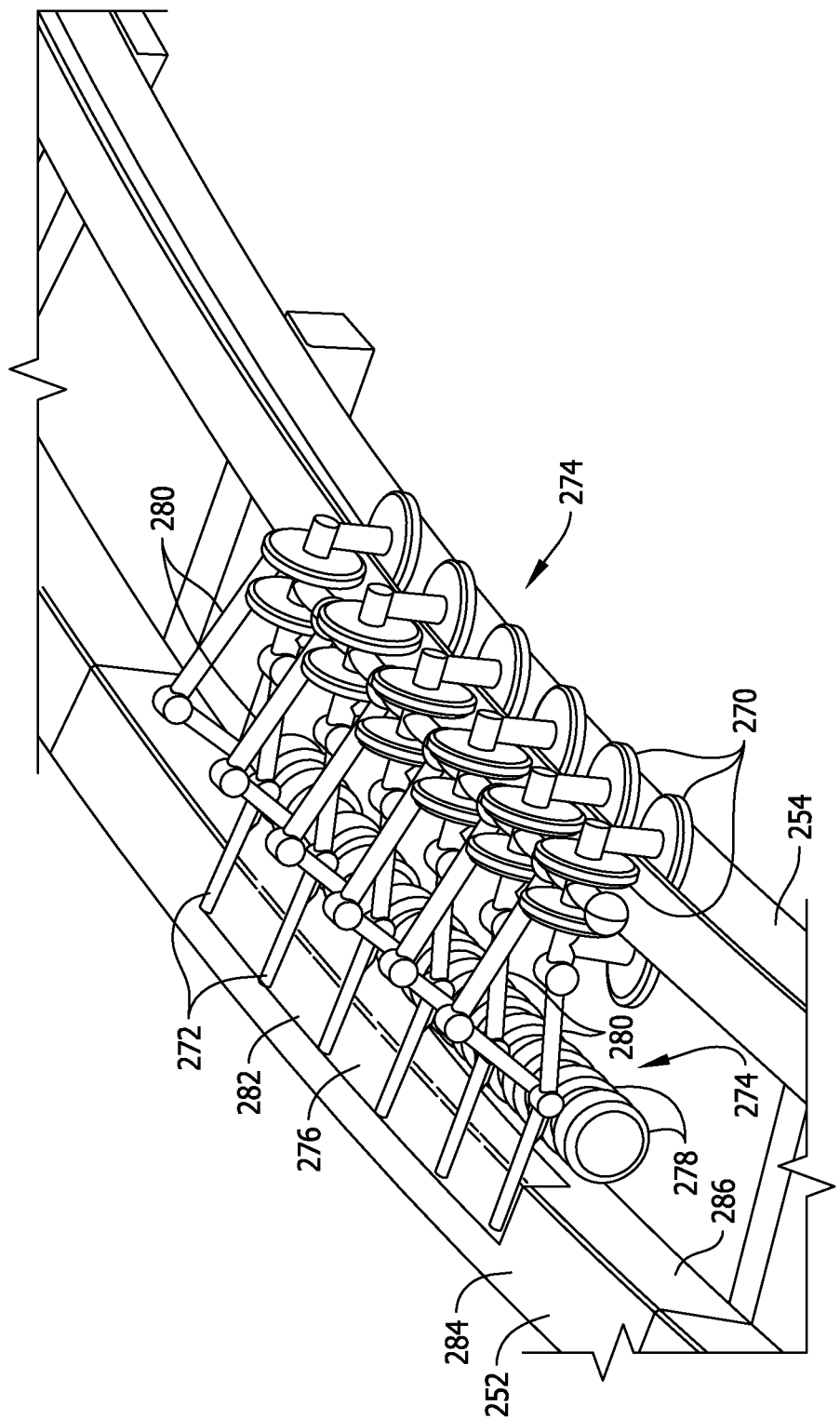
FIG. 9 is a perspective view of the ply layup device shown in FIG. 7 in a third operational position.

FIG. 7 is a perspective view of ply layup device 258 in a first operational position that may be used with apparatus 250, FIG. 8 is a perspective view of ply layup device 258 in a second operational position, and FIG. 9 is a perspective view of ply layup device 258 in a third operational position. In the exemplary implementation, ply layup device 258 includes a wheel assembly 270 engaged with track 254, and that is selectively operable to position ply layup device 258 at different locations along track 254. Alternatively, ply layup device 258 can include any suitable device for traversing itself along track 254. Ply layup device 258 also includes a ply placement member 272 and a ply shaping device 274. As described above, a continuous stringer half structure is formed from a plurality of ply segments 276 having a length less than the length of first stringer forming tool 252. Forming the continuous stringer half structure from a plurality of ply segments 276 facilitates reducing wrinkling and crimping in the continuous stringer half structure.

In one implementation, ply shaping device 274 is embodied as a plurality of rollers 278. Alternatively, any device capable of forcing ply segments 276 against first stringer forming tool 252 may be used that enables apparatus 250 function as described herein. Moreover, ply placement member 272 and ply shaping device 274 are each coupled to at least one actuating member 280 that facilitates mobilizing ply placement member 272 and ply shaping device 274 into a position for forming each ply segment 276 on first stringer forming tool 252, and for forming additional ply segments 276 on first stringer forming tool 252.

Referring to FIG. 7, in operation, ply placement member 272 is positioned to receive a first ply segment 282 thereon. Referring to FIG. 8, actuating member 280 mobilizes ply placement member 272 such that a first portion of first ply segment 282 is positioned on first stringer forming tool 252. More specifically, the first portion of first ply segment 282 is positioned on a first outer surface 284 of first stringer forming tool 252, and a second portion of first ply segment 282 hangs over first outer surface 284. Referring to FIG. 9, ply placement member 272 holds first ply segment 282 against first outer surface 284 as ply shaping device 274 forces first ply segment 282 against first stringer forming tool 252 such that the second portion of first ply segment 282 is positioned against a second outer surface 286 of first stringer forming tool 252. As such, a shape of first ply segment 282 substantially matches a contour of first stringer forming tool 252 and, more specifically, of first and second outer surfaces 284 and 286.

Figure 10:
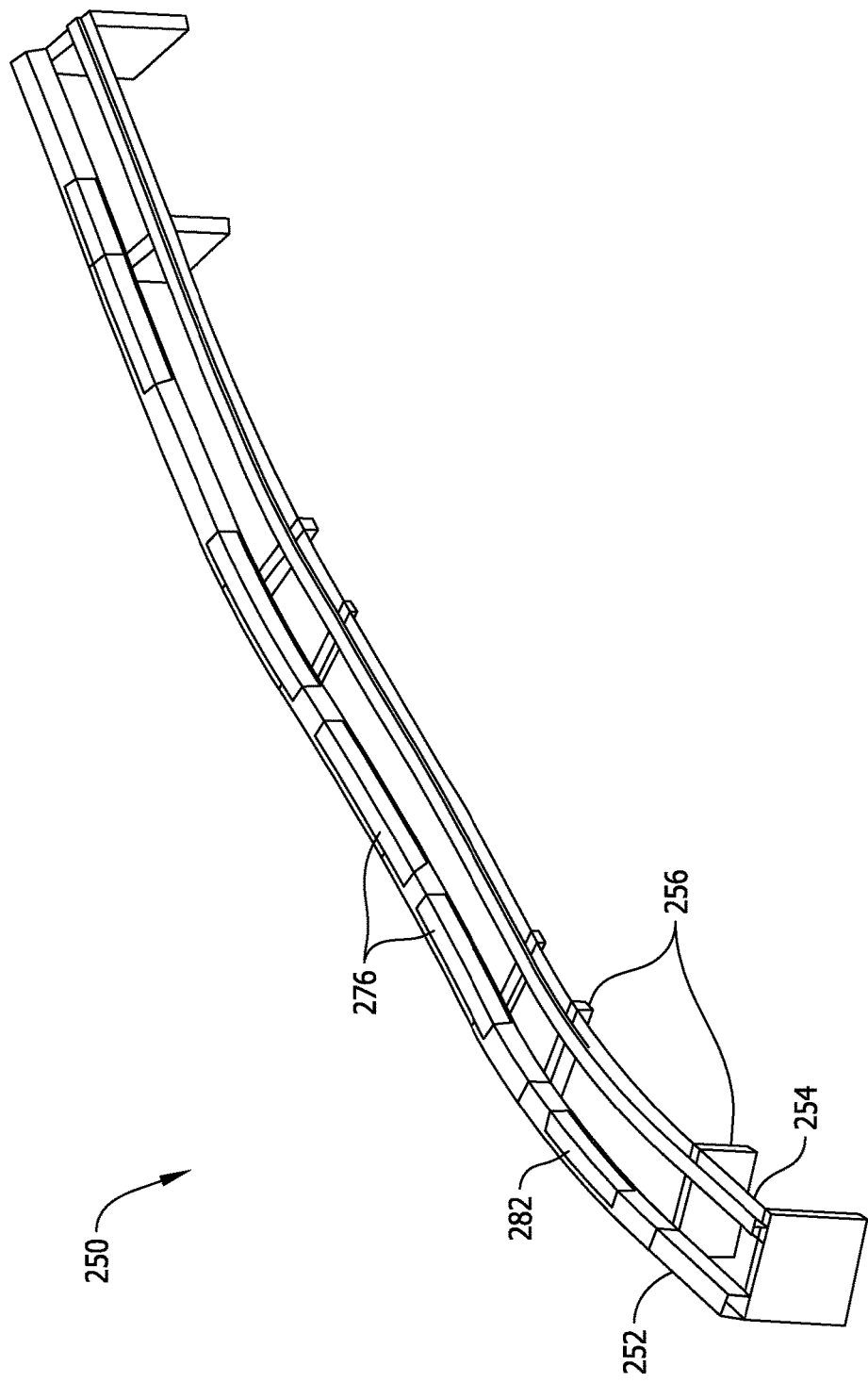
FIG. 10 is a perspective view the apparatus shown in FIG. 6 having a plurality of ply segments positioned thereon.
Figure 11:
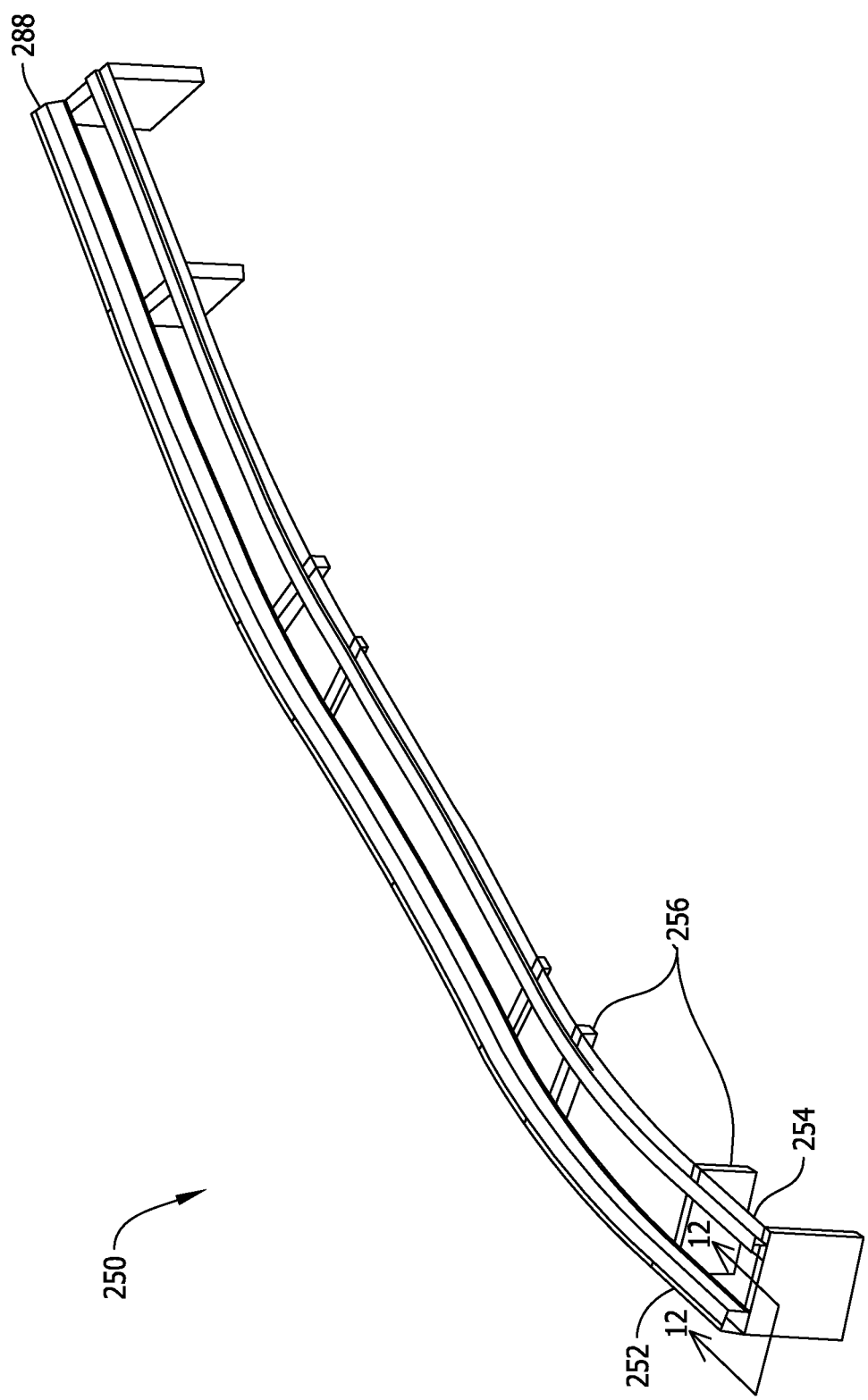
FIG. 11 is a perspective view of the apparatus shown in FIG. 6 having a first continuous stringer half structure positioned thereon and formed from a plurality of ply segments.
Figure 12:
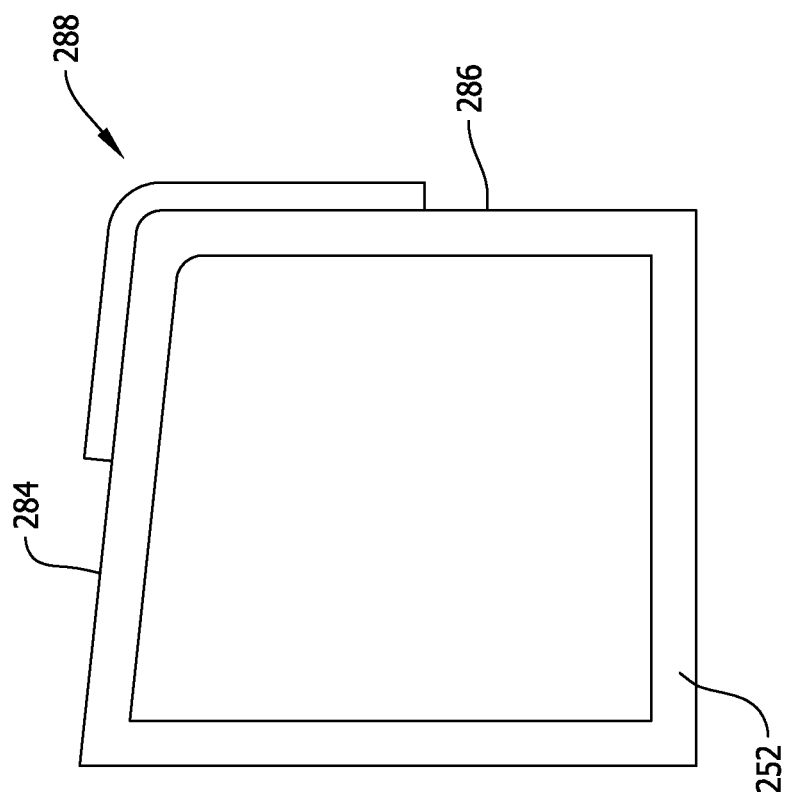
FIG. 12 is a side view of an exemplary first stringer forming tool of the apparatus shown in FIG. 11 taken along Line 12-12.

FIG. 10 is a perspective view apparatus 250 having a plurality of ply segments 276 positioned thereon, FIG. 11 is a perspective view of apparatus 250 having a first continuous stringer half structure 288 positioned thereon, and FIG. 12 is a side view of first stringer forming tool 252 of apparatus 250 taken along Line 12-12. As described above, continuous stringer half structures are formed from a plurality of ply segments 276. Referring to FIG. 10, ply layup device 258 (shown in FIGS. 7-9) positions first ply segment 282 on first stringer forming tool 252, and then positions additional ply segments 276 along the length of first stringer forming tool 252 to facilitate forming a continuous stringer half structure. Referring to FIG. 11, the plurality of ply segments 276 at least partially overlap along the length of first stringer forming tool 252 such that first continuous stringer half structure 288 is formed thereon. Referring to FIG. 12, first continuous stringer half structure 288 is formed on first and second outer surfaces 284 and 286 of first stringer forming tool 252. In the exemplary implementation, first outer surface 284 is angled relative to second outer surface 286 to facilitate forming wing structures 200 and 230 with an aerodynamic profile.

In an alternative implementation, a continuous layer of composite material may be positioned on first stringer forming tool 252 in an automated fiber placement process.

Figure 13:
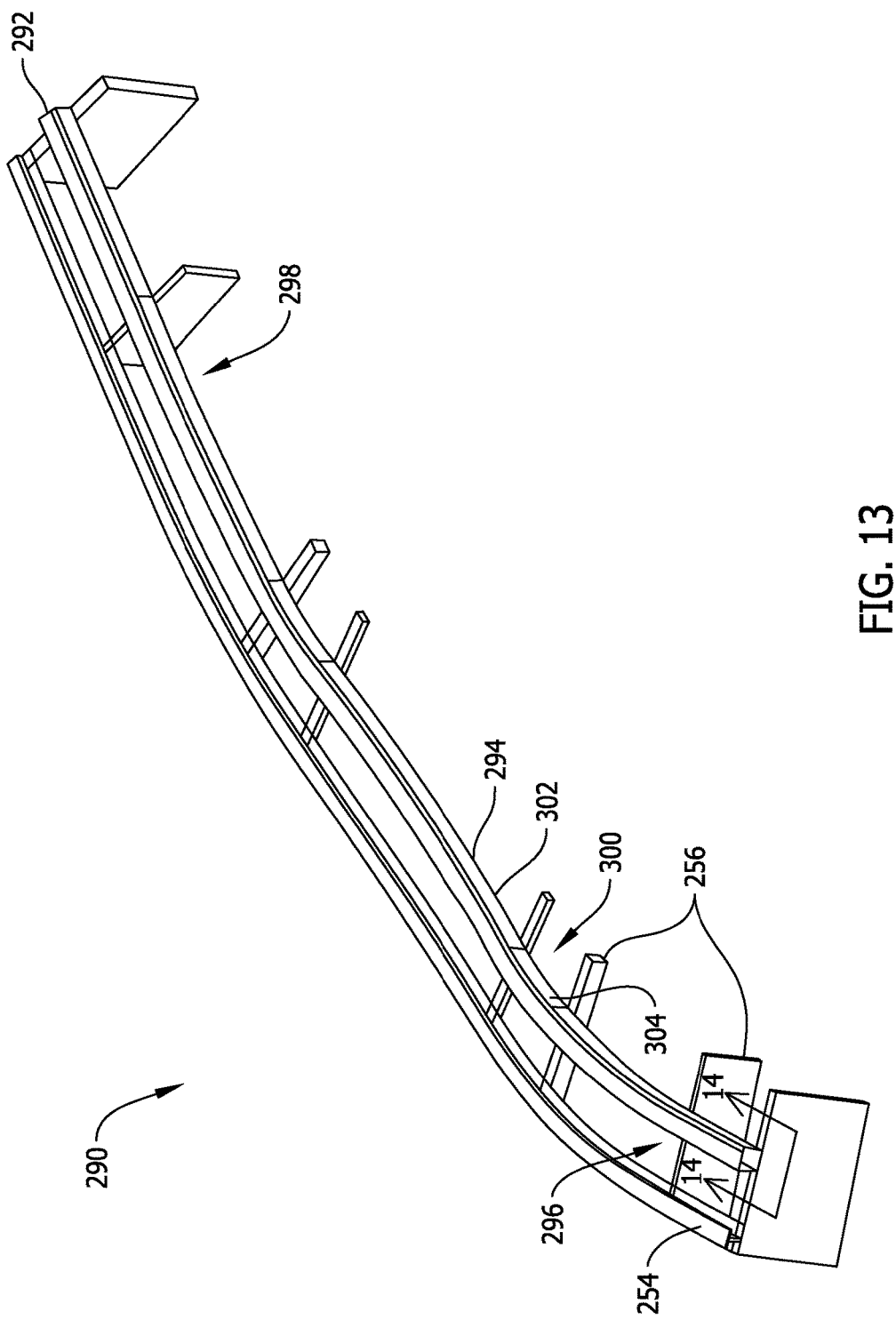
FIG. 13 is a perspective view of an alternative apparatus for forming a composite structure having a second continuous stringer half structure positioned thereon and formed from a plurality of ply segments.
Figure 14:
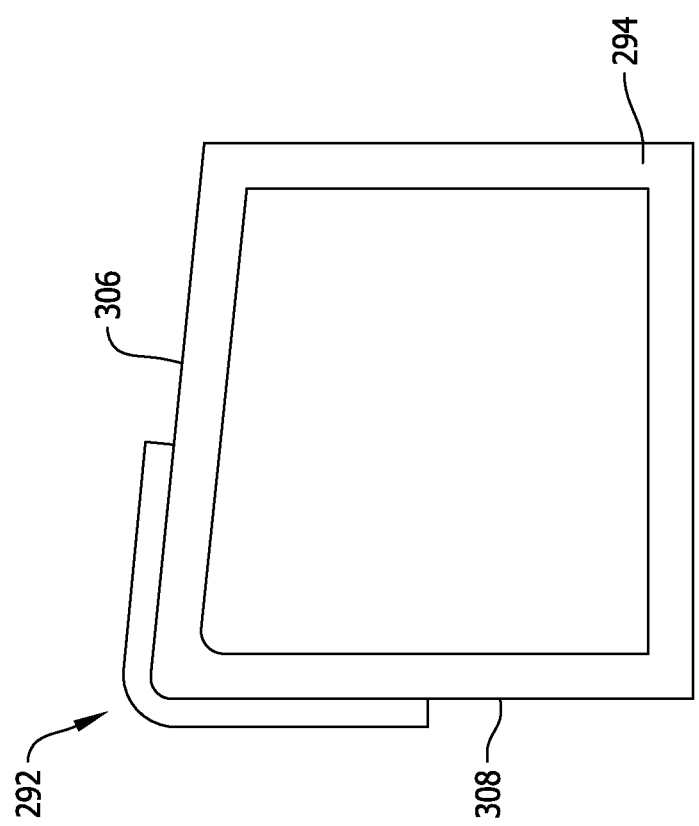
FIG. 14 is a side view of an exemplary second stringer tool of the apparatus shown in FIG. 13 taken along Line 14-14.

FIG. 13 is a perspective view of an alternative apparatus 290 for forming a composite structure having a second continuous stringer half structure 292 positioned thereon and formed from a plurality of ply segments 276, and FIG. 14 is a side view of an exemplary second stringer forming tool 294 of apparatus 250 taken along Line 14-14. In the exemplary implementation, and similar to first stringer forming tool 252, second stringer forming tool 294 has a contour that generally corresponds to a desired final shape of second stringer 210 in two-piece wing structure 230 (shown in FIG. 5), for example. More specifically, second stringer forming tool 294 includes a first straight section 296, a second straight section 298, and a curved section 300 extending between first and second straight sections 296 and 298. First straight section 296 generally corresponds to second truncated straight portion 248 of second stringer 210, curved section 300 generally corresponds to second curved portion 222 of second stringer 210, and second straight section 298 generally corresponds to third straight portion 224 of second stringer 210.

Similar to second stringer 210, curved section 300 includes a first curved segment 302 and a second curved segment 304, having different radial curvatures. As such, first curved segment 302 has a radial curvature value of at least about 500 inches, and second curved segment 304 has a radial curvature value less than the radial curvature value of first curved segment 302. In one implementation, the radial curvature value of second curved segment 304 is about 175 inches.

Referring to FIG. 13, ply layup device 258 (shown in FIGS. 7-9) traverses along track 254 and positions the plurality of ply segments 276 along second stringer forming tool 294. The plurality of ply segments 276 at least partially overlap along the length of second stringer forming tool 294 such that second continuous stringer half structure 292 is formed thereon. Referring to FIG. 14, second continuous stringer half structure 292 is formed on a first outer surface 306 and a second outer surface 308 of second stringer forming tool 294. In the exemplary implementation, first outer surface 306 is angled relative to second outer surface 308 to facilitate forming wing structures 200 and 230 with an aerodynamic profile. More specifically, as will be described in more detail below, second stringer forming tool 294 is contoured such that a stringer full structure can be formed when second stringer forming tool 294 is combined with first stringer forming tool 252.

Figure 15:
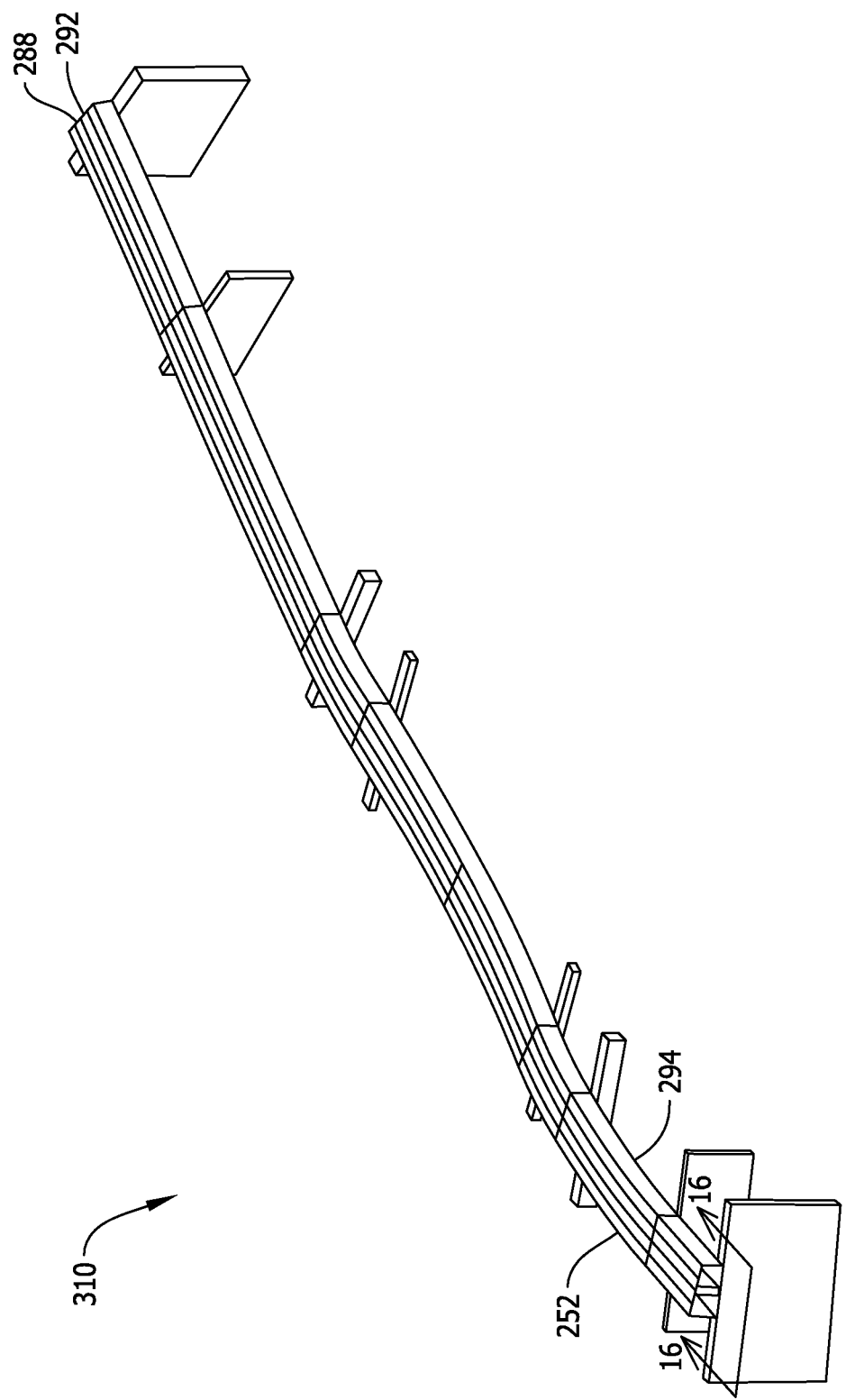
FIG. 15 is a perspective view of an exemplary stringer forming assembly including the first and second stringer forming tools shown in FIGS. 12 and 14 for forming a continuous stringer structure.
Figure 16:
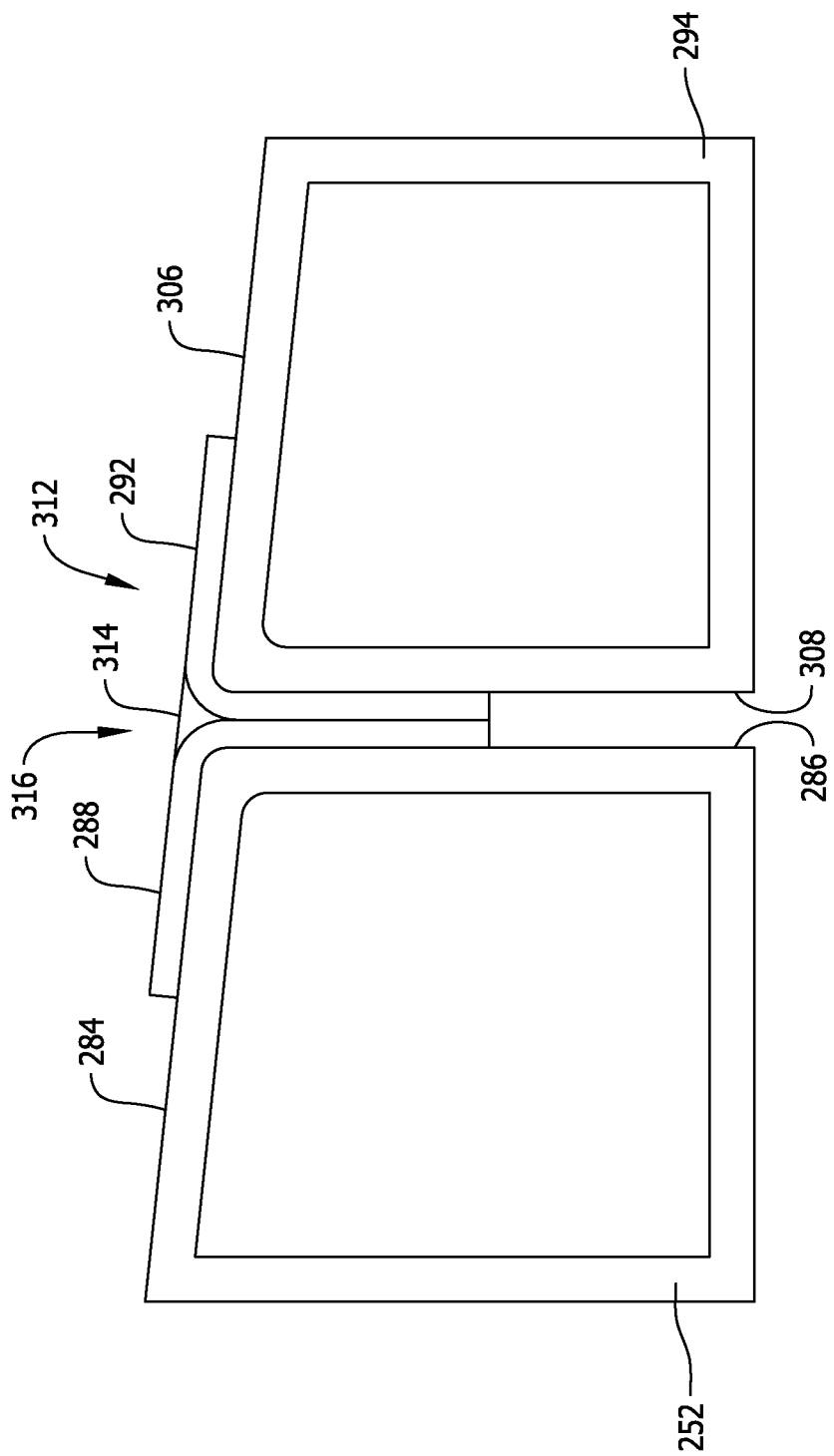
FIG. 16 is a side view of the stringer forming assembly shown in FIG. 15 taken along Line 16-16.

FIG. 15 is a perspective view of an exemplary stringer forming assembly 310 including first and second stringer forming tools 252 and 294 for forming a continuous stringer structure 312, such as second stringer 210, FIG. 16 is a side view of stringer forming assembly 310 taken along Line 16-16. In the exemplary implementation, stringer forming assembly 310 includes first and second stringer forming tools 252 and 294 positioned adjacent to each other such that first and second continuous stringer half structures 288 and 292 are coupled to each other. First continuous stringer half structure 288 defines a first portion of continuous stringer structure 312, and second continuous stringer half structure 292 defines a second portion of continuous stringer structure 312.

As described above, first outer surfaces 284 and 306 of respective stringer forming tools 252 and 294 are angled to facilitate forming wing structures 200 and 230 with an aerodynamic profile. As such, referring to FIG. 16, the angles of first outer surface 284 of first stringer forming tool 252 and first outer surface 306 of second stringer forming tool 294 are selected such that first outer surfaces 284 and 306 substantially align with each other when forming continuous stringer structure 312. Moreover, a radius filler 314 is positioned within a radius cavity 316 defined between bent portions of first and second continuous stringer half structures 288 and 292 to further define continuous stringer structure 312. Continuous stringer structure 312 is then cured in an autoclave cycle.

Figure 17:
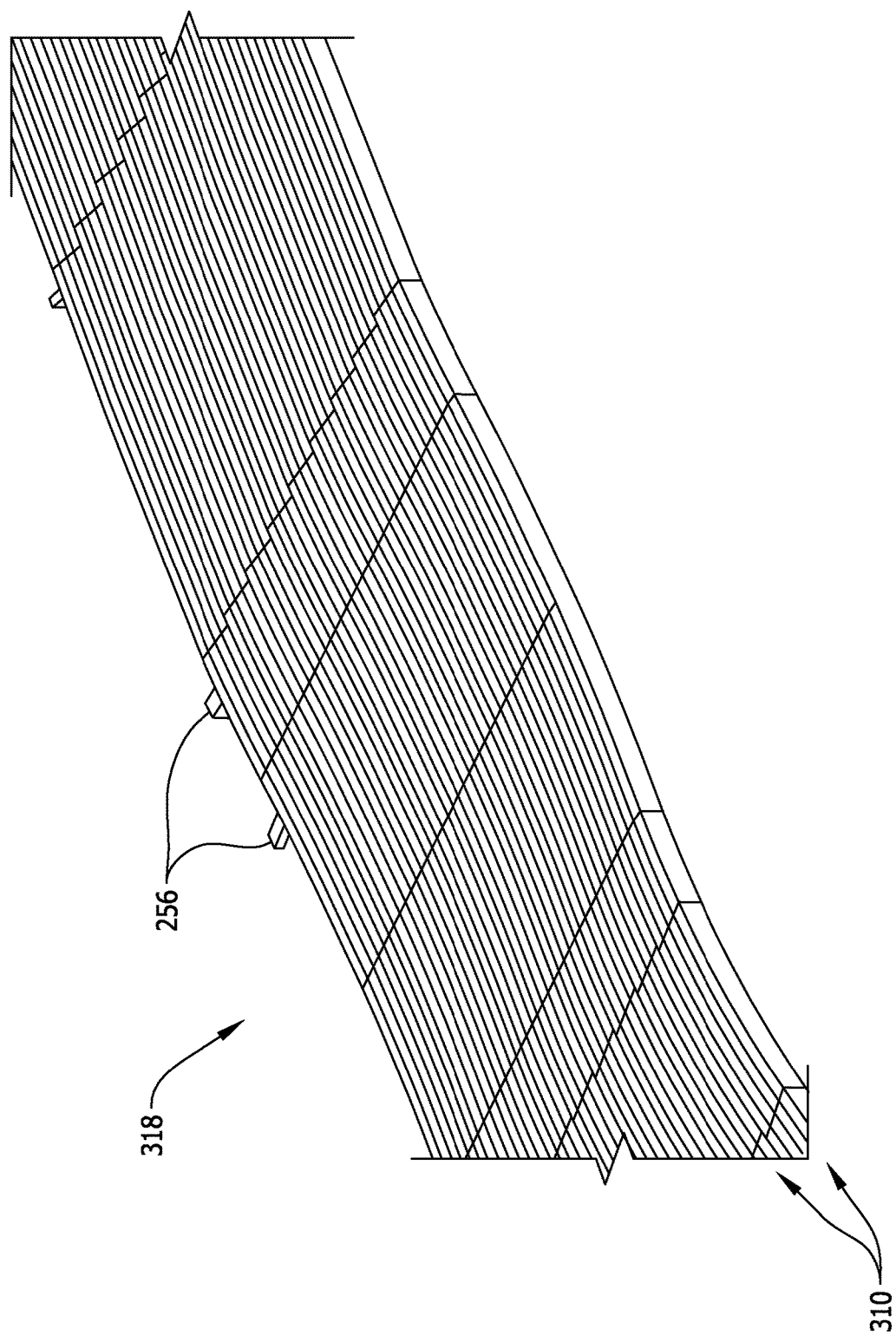
FIG. 17 is a perspective view of an exemplary mold line forming tool formed from a plurality of stringer forming assemblies shown in FIG. 16.
Figure 18:
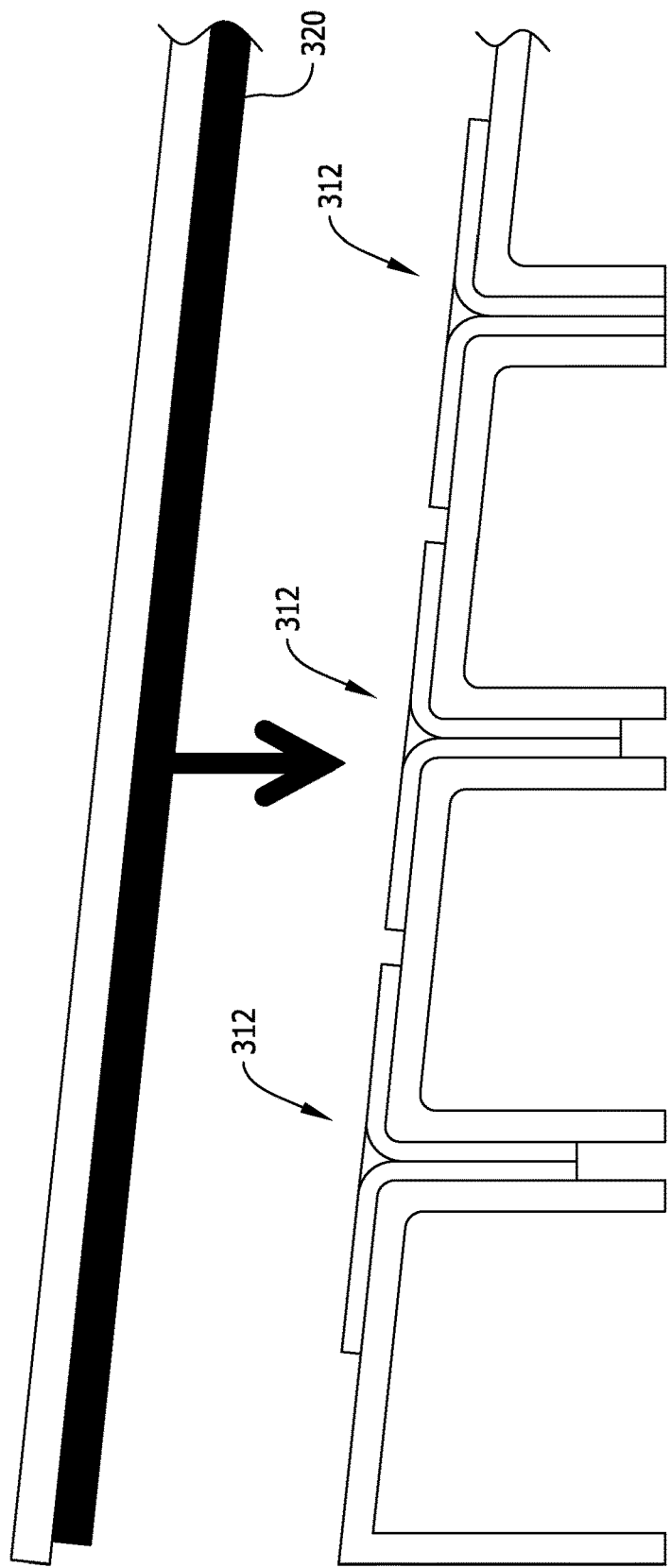
FIG. 18 is an illustration of a process for forming a wing skin on the mold line forming tool shown in FIG. 17.

FIG. 17 is a perspective view of an exemplary mold line forming tool 318 formed from a plurality of stringer forming assemblies 310, and FIG. 18 is an illustration of a process for forming a wing skin 320 on mold line forming tool 318. In the exemplary implementation, stringer forming assemblies 000 for each stringer 210 in one of wing structures 200 and 230 (shown in FIGS. 4 and 5) are arranged in series on brackets 256. Referring to FIG. 18, wing skin 320, formed from composite material cured in an autoclave cycle separately from continuous stringer structures 312, is positioned over stringer forming assemblies 310 for coupling to continuous stringer structures 312. In one implementation, the stringer forming tools are contoured such that more than one continuous stringer half structure can be formed on opposing side thereof. Continuous stringer structures 312 and wing skin 320 are then co-bonded together in an autoclave cycle to form either an upper half or a lower half of one of wing structures 200 and 230.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wing structure for use with an aircraft, said wing structure comprising:
   at least one wing section comprising:
      an inboard portion;
      at least one outboard portion angled rearward from said inboard portion; and
      at least one stringer comprising a curved portion that extends across an interface defined between said inboard portion and said at least one outboard portion, said curved portion having a radial curvature such that said at least one stringer extends continuously along said inboard portion and said at least one outboard portion, said curved portion comprising a first curved segment extending outboard from the interface, and a second curved segment extending inboard from the interface, wherein said first curved segment has a greater radial curvature than said second curved segment.

2. The structure in accordance with claim 1, wherein said first curved segment has a radial curvature value of at least about 500 inches, and said second curved segment has a radial curvature value less than the radial curvature value of said first curved segment.

3. The structure in accordance with claim 1, wherein said at least one outboard portion comprises a first outboard portion and a second outboard portion angled rearward from opposing sides of said inboard portion, said at least one stringer extending continuously along said first outboard portion, said inboard portion, and said second outboard portion.

4. The structure in accordance with claim 1, wherein said at least one stringer is fabricated from composite material.

5. The structure in accordance with claim 1 wherein said at least one wing section comprises:
   a first wing section that comprises a first inboard portion, a first outboard portion, and wherein said at least one stringer comprises a first stringer that extends at least partially along said first inboard portion and said first outboard portion; and
   a second wing section that comprises a second inboard portion, a second outboard portion, and wherein said at least one stringer comprises a second stringer that extends at least partially along said second inboard portion and said second outboard portion.

6. The structure in accordance with claim 5 further comprising a coupling mechanism configured to couple said first and second wing sections together at said first and second inboard portions, thereby forming a complete wing structure.

7. An aircraft comprising:
   a fuselage; and
   at least one wing section coupled to said fuselage, said at least one wing section comprising:
      an inboard portion;
      an outboard portion angled rearward from said inboard portion; and
      at least one stringer comprising a curved portion that extends across an interface defined between said inboard portion and said outboard portion, said curved portion having a radial curvature such that said at least one stringer extends continuously along said inboard portion and said outboard portion, said curved portion comprising a first curved segment extending outboard from the interface, and a second curved segment extending inboard from the interface, wherein said first curved segment has a greater radial curvature than said second curved segment.

* * * * *